US010119601B2

(12) United States Patent
Bonfiglio et al.

(10) Patent No.: US 10,119,601 B2
(45) Date of Patent: Nov. 6, 2018

(54) MOTOR WITH LINEAR ACTUATORS

(71) Applicants: Paolo Bonfiglio, San Vittore (CH);
Nicola Lussorio Cau, Milan (IT)

(72) Inventors: Paolo Bonfiglio, San Vittore (CH);
Nicola Lussorio Cau, Milan (IT)

(73) Assignee: PHI DRIVE S.R.L., Turin (IT)

(*) Notice: Subject to any disclaimer, the term of this patent is extended or adjusted under 35 U.S.C. 154(b) by 428 days.

(21) Appl. No.: 14/414,560

(22) PCT Filed: Jul. 17, 2013

(86) PCT No.: PCT/IB2013/055866
§ 371 (c)(1),
(2) Date: Jan. 13, 2015

(87) PCT Pub. No.: WO2014/013442
PCT Pub. Date: Jan. 23, 2014

(65) Prior Publication Data
US 2015/0167801 A1 Jun. 18, 2015

(30) Foreign Application Priority Data

Jul. 17, 2012 (IT) .............................. VI2012A0173

(51) Int. Cl.
*F16H 35/18* (2006.01)
*F16H 49/00* (2006.01)
(Continued)

(52) U.S. Cl.
CPC ............ *F16H 35/18* (2013.01); *F01B 19/04* (2013.01); *F16H 49/001* (2013.01);
(Continued)

(58) Field of Classification Search
CPC .......... F16H 35/18; F16H 25/12; F16H 19/00; F16H 19/02; F16H 19/04; F16H 49/001;
(Continued)

(56) References Cited

U.S. PATENT DOCUMENTS 3,854,383 A * 12/1974 Paynter .................. F01B 19/04
91/180
3,973,471 A * 8/1976 Hirmann ................ F01B 19/04
91/180

(Continued)

FOREIGN PATENT DOCUMENTS

DE         19747566 C1      4/1999
WO       2009071604 A1      6/2009

OTHER PUBLICATIONS

English Translation of DE19747566, 2018.*

*Primary Examiner* — Victor L MacArthur
*Assistant Examiner* — Bobby Rushing, Jr.
(74) *Attorney, Agent, or Firm* — Volpe and Koenig, P.C.

(57) ABSTRACT

A motor powered by linear actuators comprises a base plane in which a plurality of linear actuators (2, 2', 2", 20) operate by reciprocating along respective lines of action (X, X', X"), an elastic conversion member (3, 30) which is adapted to move in the plane and suitable to be connected to a drive shaft (S). The linear actuators (2, 2', 2", 20) are operatively connected with the conversion member (3, 30) for converting the reciprocating motion of the linear actuators (2, 2', 2", 20) into a substantially continuous motion of the conversion member (3, 30). The motor also comprises stationary constraint means (4, 40) which are adapted to selectively interact with the conversion member (3, 30) to locally deform it and/or promote sliding and movement thereof the plane about a predetermined axis or in a predetermined direction in response to the action of the linear actuators (2, 2', 2", 20).

4 Claims, 5 Drawing Sheets

(51) Int. Cl.
*F01B 19/04* (2006.01)
*H02N 2/10* (2006.01)
*H02N 2/02* (2006.01)

(52) U.S. Cl.
CPC ............. *H02N 2/021* (2013.01); *H02N 2/105* (2013.01); *Y10T 74/18056* (2015.01)

(58) Field of Classification Search
CPC .. F16H 2049/006; H02N 2/021; H02N 2/105; H02N 2/025; H02N 2/101; H02N 2/005; H02N 2/103; H01L 41/0946; H01L 41/094; F01B 19/00; F01B 19/04
See application file for complete search history.

(56) References Cited

U.S. PATENT DOCUMENTS

| | | | | |
|---|---|---|---|---|
| 4,033,239 A * | 7/1977 | Gsching | ............... | F01B 1/0641 91/491 |
| 4,782,262 A * | 11/1988 | Kiyo-Oka | ............. | H02N 2/105 310/317 |
| 5,068,565 A * | 11/1991 | Huang | ................... | H02N 2/105 310/328 |
| 5,144,187 A * | 9/1992 | Culp | ...................... | H02N 2/105 310/323.02 |
| 5,378,948 A * | 1/1995 | Richter | .................. | H02N 2/023 310/328 |
| 7,005,779 B2 * | 2/2006 | Erickson | .................. | H02N 2/18 310/328 |
| 7,071,596 B2 * | 7/2006 | Krill | ........................ | H02N 2/10 310/328 |
| 7,474,036 B2 * | 1/2009 | Tsujino | ..................... | B06B 3/00 310/317 |
| 7,980,074 B2 * | 7/2011 | Gao | ........................ | F03G 7/065 60/527 |
| 2002/0088342 A1 * | 7/2002 | Kim | ........................ | F01B 19/04 92/72 |
| 2008/0074000 A1 | 3/2008 | Bennett et al. | | |
| 2012/0147344 A1 | 6/2012 | Weber et al. | | |

* cited by examiner

MOTOR WITH LINEAR ACTUATORS

FIELD OF THE INVENTION

The present invention generally finds application in the field of energy conversion machines and particularly relates to a motor powered by the movement of linear actuators.

BACKGROUND ART

Motors are known which are designed to accomplish the motion of a load from an electric, pneumatic, oil-hydraulic or other source of energy.

Particularly, motors are known which comprise a plurality of actuators designed for interaction with a rotary or linear moving member, by interaction with an elastic member operatively connected to the moving member, to promote rotation or translation thereof.

The synchronized action of the actuators on the elastic member will cause local deformation thereof, such that the moving member may receive the driving force required to accomplish its motion.

For example, U.S. Pat. No. 5,068,565 discloses a motor that comprises, in a particular configuration, a substantially annular motion transfer member, which is adapted to rotate about an axis of rotation, and a plurality of linear actuators arranged at the periphery of the axis to operate in axial directions.

Specifically, each actuator acts upon an appropriately shaped intermediate elastomeric body, which is placed at the periphery of the annular member, substantially coaxial therewith, with the interposition of a flexible elliptical bearing, which is designed to contact the moving member.

The actuators sequentially act upon the elastomeric body, to deform it and cause its radial expansion.

Therefore, the elastomeric body will act upon the flexible bearing by its deformed outer edge, by exerting a pressure thereon, for local radial deformation thereof.

The deformation of the bearing will cause application of an appropriate torque on the annular moving member, for rotation thereof.

A first drawback of this arrangement is that the provision of an intermediate element or the elliptical flexible bearing considerably increases the complexity of the motor.

This is because a very small clearance exists between the flexible bearing and the moving member, whereby particularly strict tolerances are required in the fabrication of these parts.

It shall be particularly noted that the amount of bending of the intermediate element is a measure of the transmissible torque.

Therefore, when using actuators that can exert high forces with small displacements, generally of the order of micrometers, this displacement will be directly responsible for the amount of deformation, whereby torques of relatively small value might only be transmitted.

This is an apparent restriction to scalability of the motor, as it would require the intermediate member to have a low ellipticity, and involve operational difficulties, because of the strict tolerances imposed thereupon.

Furthermore, the high accuracy required in the fabrication of these parts result in a considerable increase of the overall motor costs.

Also, these motors comprise a great number of mechanical parts, whose assembly requires the utmost care, and considerably increases motor fabrication times, in addition to involving higher friction and, as a result, higher performance losses and wear.

Finally, when the direction of rotation is reversed, the bearing has a clearance that affects accuracy of this movement.

DISCLOSURE OF THE INVENTION

The object of the present invention is to overcome the above drawbacks, by providing a motor with linear actuators that achieves high efficiency and relative cost effectiveness.

A particular object of the present invention is to provide a motor powered by linear actuators that, with actuators running the same translation distance, allows a comparatively higher torque to be transferred to the driving member.

Another object is to provide a motor powered by linear actuators that has substantially no clearance during reversal motion.

Yet another object is to provide a motor powered by linear actuators that affords simple construction and assembly, with parts having relatively low fabrication tolerances, and with little maintenance requirements.

A further object of the present invention is to provide a motor powered by linear actuators that has a smaller number of parts, thereby involving lower friction losses and wear.

Not the least, an object of the present invention is to provide a linear actuator-powered motor that is particularly accurate, as well as flexible and adaptable to various fields of use.

These and other objects, as better explained hereafter, are fulfilled by a high-accuracy motor as defined in claim 1.

This combination of features will provide a motor characterized by high construction simplicity and sturdiness, that is also particularly flexible in its applications, and easily scalable.

Advantageous embodiments of the invention are obtained in accordance with the dependent claims.

BRIEF DESCRIPTION OF THE DRAWINGS

Further features and advantages of the invention will become more apparent upon reading of the detailed description of two preferred, non-limiting embodiments of a high-accuracy motor of the invention, which are described as non-limiting examples with the help of the accompanying drawings in which.

DETAILED DESCRIPTION OF A PREFERRED EMBODIMENT

Figure 1:
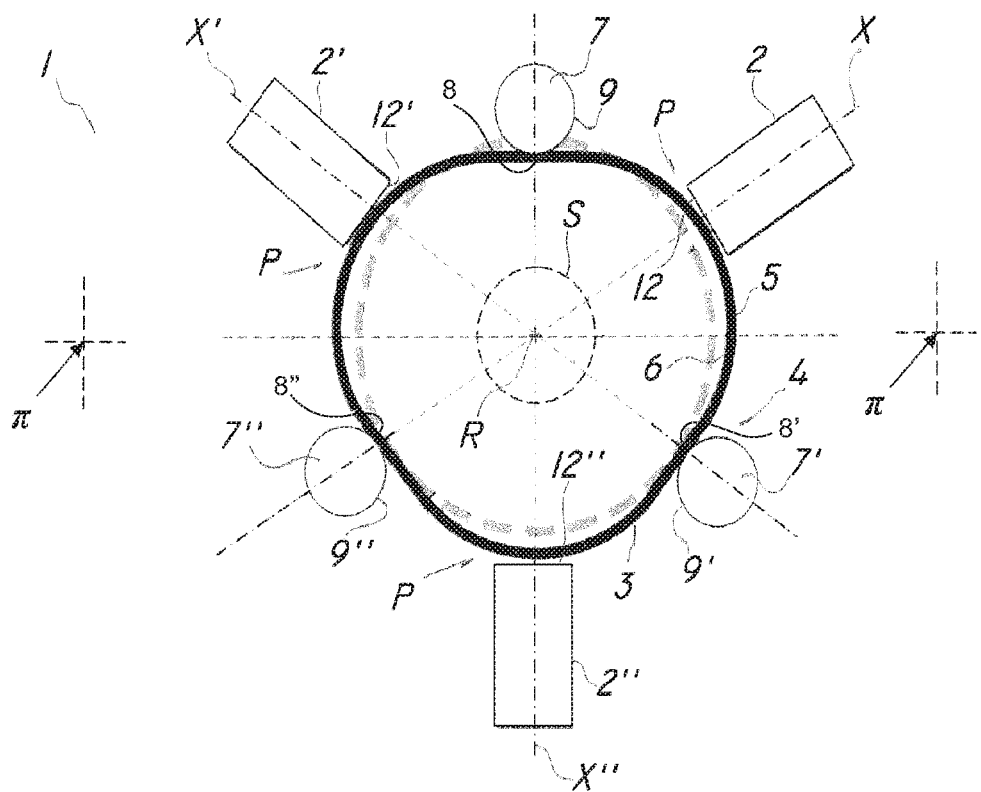
FIG. 1 is a front schematic view of a motor of the invention in a first preferred configuration.

FIG. 1 is a schematic view of a first preferred, non-limiting configuration of a motor of the invention, generally designated by numeral 1.

The motor 1 is designed to be connected to a drive shaft S, as schematically shown herein, which may in turn be connected to a load, not shown, for high-accuracy motion thereof.

Particularly, the motor 1 of the invention is designed for use in electrical or electromechanical apparatus requiring light-weight loads to be moved at relatively high speeds and with relatively high accuracy. For example, the motor 1 may be used in the fields of electronic devices, precision-mechanics, instrumentation or other equivalent fields.

Nevertheless, as explained hereinbelow, the motor 1 has features that allow scalability, both in terms of scale increase and reduction, such that it can be also used for moving relatively heavy loads, that require delivery of a relatively high torque.

The motor 1 basically comprises a base plane π, in which a plurality of actuators 2, 2', 2" are arranged, operating along respective lines of action X, X', X", preferably substantially parallel to the base plane π.

Furthermore, the motor 1 comprises an elastic conversion member 3, which is adapted to move in the plane π and to be connected to the drive shaft S or to similar power take-off means.

In this particular configuration, the conversion member 3 has a substantially annular shape, is substantially in elastically deformable sheet form.

The actuators 2, 2', 2" are arranged at the periphery of the conversion member 3, outside or inside the latter, for sequential interaction therewith along respective lines of action X, X', X" substantially orthogonal to the conversion member 3, such that substantially radial stresses may be respectively transferred thereby.

Thus, the substantially linear motion of the actuators 2, 2', 2" may be converted into a substantially continuous motion of the conversion member 3.

In the configuration of FIG. 1 three actuators 2, 2', 2" are shown, which are arranged outside the conversion member 3. Nevertheless, a different number of actuators may be provided, without particular limitation, also depending on the overall size of the motor 1 or the torques to be transmitted.

Unless otherwise stated, for simplicity the actuators 2, 2', 2" and their parts will be will be hereinafter designated by the non-indexed number 2, anything concerning the actuator 2 being intended to be found in a substantially similar and technically equivalent manner in the other actuators 2', 2"

The actuators 2 may be selected from the group comprising hydraulic, pneumatic, electric, piezoelectric actuators or the like, without particular limitation.

In a particularly preferred embodiment of the motor 1 of the invention, the actuators 2 are of piezoelectric type, as their configuration allows size reduction and can provide small-size motors 1.

According to a peculiar feature of the invention, the motor 1 comprises stationary constraint means 4, which selectively act upon the conversion member 3 to cause its deformation upon the action of the actuators 2 and to promote sliding and movement thereof in the plane π along a predetermined axis and in a predetermined direction.

Thus, the force exerted by each actuator 2 on the conversion member 3 will cause a deformation thereof parallel to the line of action X of that actuator 2 and a consequent reaction of the stationary constraint means 4.

This reaction will cause the conversion member 3 to slide on the stationary constraint means 4 such that it will rotate in the plane π with predetermined direction and torque $C_m$.

The stationary constraint means 4 may be adapted to prevent the conversion member 3 from moving in planes other than the plane π and particularly to restrict its movement to one degree of freedom.

In the first illustrated configuration, the stationary constraint means 4 are adapted to allow the conversion member 3 to only rotate about a substantially central axis of rotation R, orthogonal to the base plane π.

Conveniently, the conversion member 3 may have a pair of opposite surfaces 5, 6, and at least one of such surfaces 5, 6 may be an active surface, adapted for interaction with the actuators 2 and/or the stationary constraint means 4.

Specifically, if the conversion member 3 has an annular shape, both the actuators 2 and the constraint means 4 may be located outside the conversion member 3 for interacting with the outer active surface 5 only, and exerting respective forces and reactions parallel to the actuation directions X.

The conversion member 3 may be made of a first base material having a high strength and a considerable elasticity.

For example, in motors 1 that are required to deliver a relatively high torque $C_m$, the conversion member 3 may be made of a substantially metal-based material selected from the group of alloys, steels or other similar materials.

Otherwise, in motors 1 that are required to deliver a relatively low torque $C_m$, the conversion member 3 may be made of a substantially polymeric material having high elastic properties.

Conveniently, the stationary constraint means 4 may comprise a plurality of pin members 7, 7', 7", . . . each having a front surface 8, 8', 8" and a lateral surface 9, 9', 9".

Here again, for simplicity, unless otherwise stated, reference will be made to the pin members and their parts using non-indexed numerals.

In the first illustrated embodiment, the pin members 7 interact with the active surface 5 of the conversion member 3 through their respective lateral surfaces 9.

The latter will be formed with an appropriate shape, e.g. a substantially cylindrical shape with an axis or a directrix substantially orthogonal to the plane π, for easier sliding of the active surface 5 thereon, in response to the force exerted by the actuators 2 and the reaction generated by the pin members 7.

Nevertheless, the pin members 7 may also have different shapes, e.g. with substantially flat, or possibly concave lateral surfaces, without particular limitation.

Likewise, the front surface 12 of the actuators 2 for interaction with the active surface 5, 6 of the annular member 3 may also have different shapes, as more clearly explained below.

Conveniently, the pin members 7 are peripherally arranged outside the annular conversion member 3 in angularly equally spaced positions.

Figure 2:
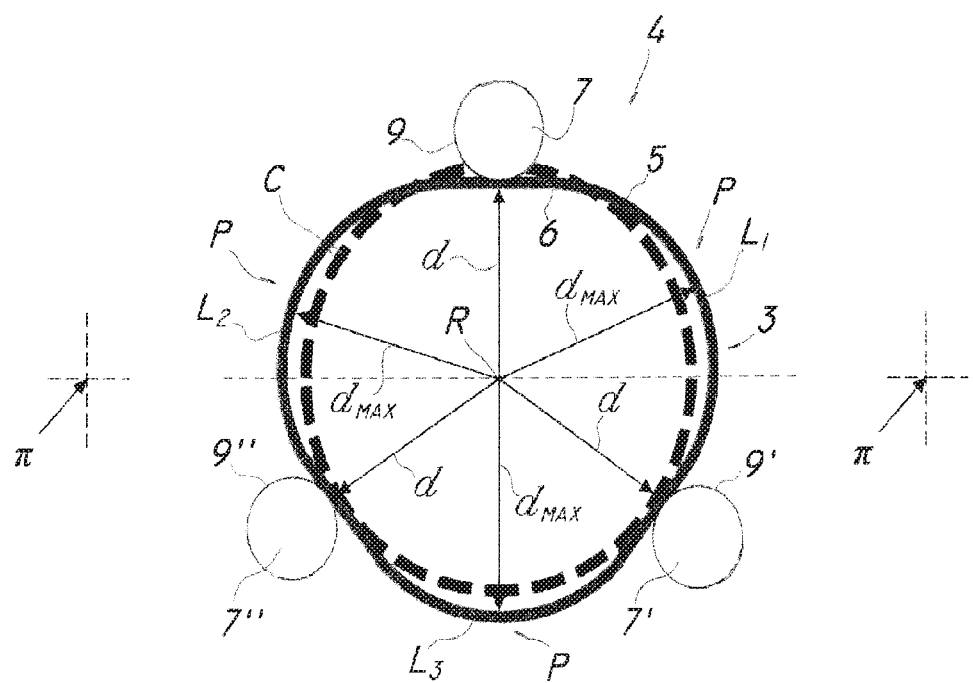
FIG. 2 shows the motor of FIG. 1 with certain elements omitted.
Figure 3:
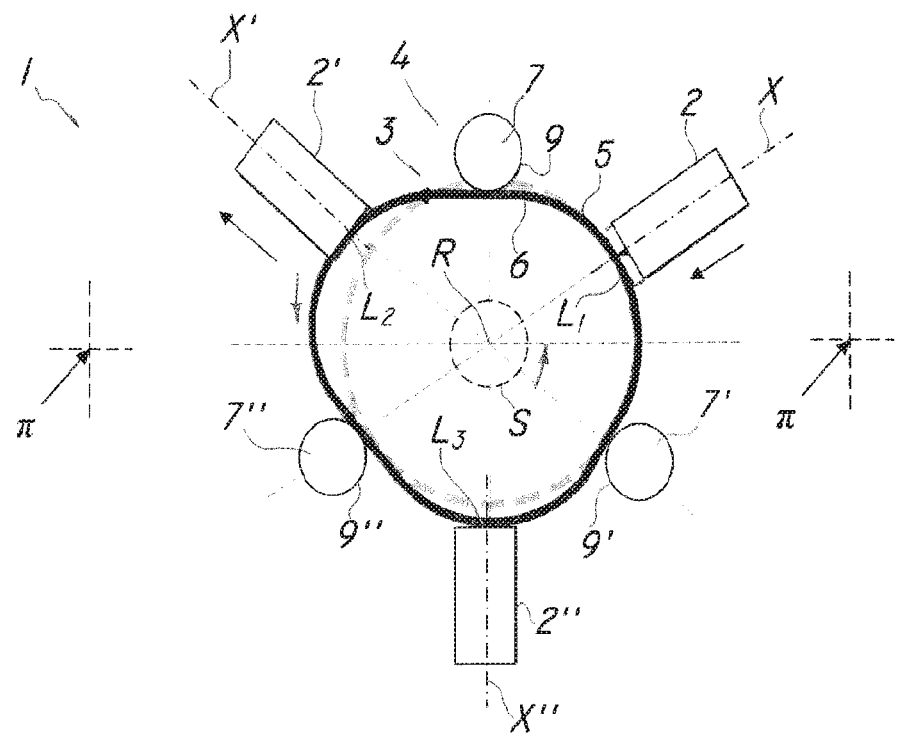
FIGS. 3 to 5 show front views of the motor of FIG. 1 in a particular operational sequence.
Figure 4:
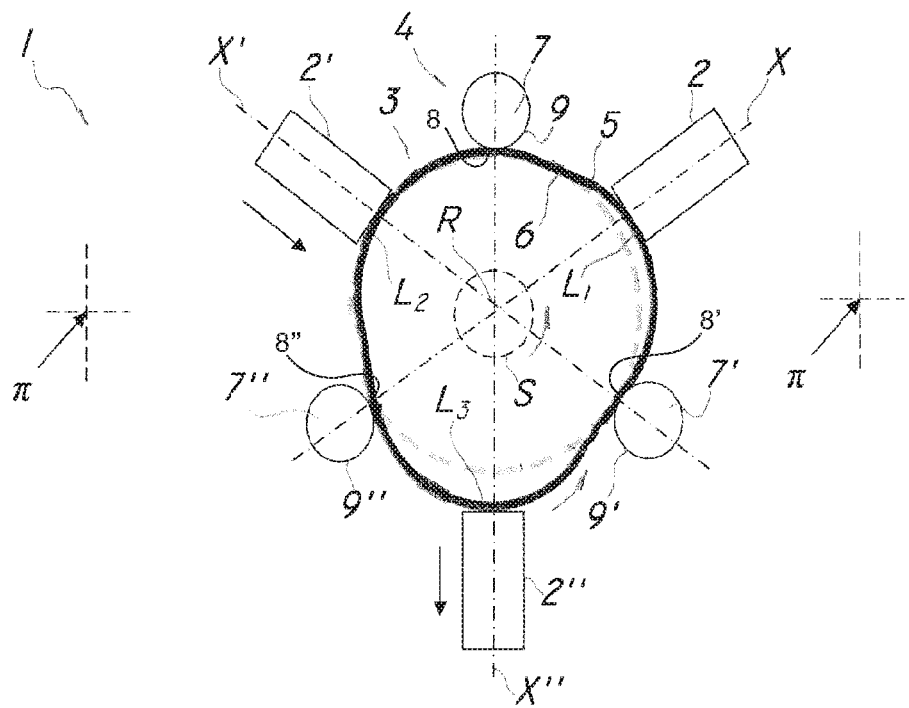
Figure 5:
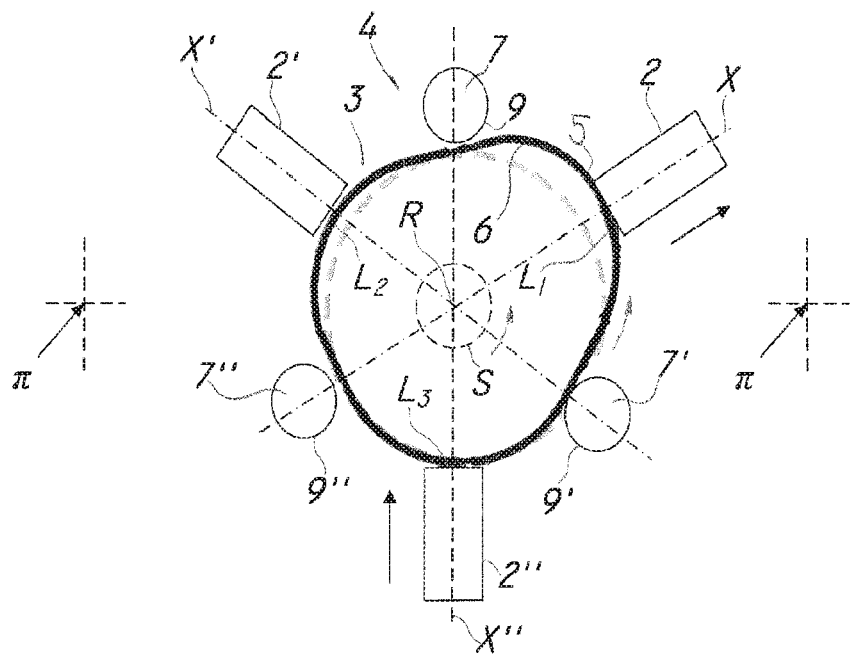

Particularly, the pin members 7 have respective lateral surfaces substantially tangent to a circumference C, as shown by a dashed line in FIG. 2, which is substantially coaxial with the conversion member 3 but with a diameter d slightly smaller than that of the conversion member 3 in its undeformed shape.

Thus, the pin members 7 radially compress the annular member 3 inwards, thereby deforming respective portions $L_1, L_2, L_3$ into a substantially lobe shape, with each lobed portion $L_1, L_2, L_3$, . . . interposed between two successive pin members 7.

In the configuration of FIG. 1, the pin members 7 are configured to deform the conversion member 3, thereby defining three lobe-shaped deformed portions $L_1$, $L_2$, $L_3$ having substantially equal maximum radial distances $d_{max}$ from the axis of rotation R.

Advantageously, there are as many pin members 7 as there are actuators 2, three in the illustrated case, which are arranged alternately thereto, in positions diametrically opposite to respective actuators 2.

Therefore, the actuators 2 will interact with the active surface 5 of the annular conversion member 3 at the deformed portion section P or lobe $L_1$, $L_2$, $L_3$, . . . at the maximum radial distance $d_{max}$ from the axis of rotation R.

Furthermore, the actuators 2 may be movable along their respective substantially radial lines of action X for sequentially and radially deforming at least one of the lobes $L_1$, $L_2$, $L_3$, . . . and promoting a corresponding substantially radial reaction of one or more pin members 7.

This reaction will assist the sliding motion of the annular conversion member 3 about the axis of rotation R in a predetermined direction of rotation.

Furthermore, the particular arrangement of the pin members 7 will cause their reaction to be proportional to the deformation pressure exerted on the conversion member 3.

Particularly, the torque of the motor 1 may be proportional to the total deformation pressure exerted by the pin members 7 on the active surface 5 of the annular conversion member 3, such that any increase of such pressure involves a consequent increase of the torque of the motor 1.

The deformation pressure may be changed by changing the diameter d of the circumference C defined by the pin members 7 or the outside diameter of the annular conversion member 3.

Alternatively, the total deformation pressure may be changed by increasing or decreasing the number of pin members 7 arranged at the periphery of the conversion member 3 or possibly by increasing the stiffness of the annular member 3, while maintaining the same radius.

In operation, as shown by the sequence of FIGS. from 3 to 5, the actuators 2, 2', 2" will sequentially act in a controlled manner along their respective lines of action X to promote radial deformation of one lobe $L_1$, $L_2$, $L_3$, . . . at a time.

Particularly, the movement of the actuators 2, 2', 2" may be controlled such that, as a first actuator 2 approaches to promote deformation of a corresponding lobe $L_1$, a second actuator 2' directly adjacent thereto will depart, whereas the other actuator 2", or the other actuators when a greater number of them is provided, will remain still.

As a result, the lobe $L_1$ may move closer to the center of the annular member 3 whereas the lobe $L_2$ will move away from it as it is not radially constrained by its respective actuator 2'.

The displacement of the lobes will cause the annular member 3 to slide on the pin member 7 in the direction from the actuator 2 to the actuator 2'.

Therefore, it will be appreciated that appropriate synchronization of the radial translational movements of the actuators 2, 2', 2" toward and away from the annular member 3 will cause the deformed portion to slide and the annular member 3 to be accordingly rotated.

The reaction of the stationary constraint means 4 in response to sequential deformation of the lobes $L_1$, $L_2$, $L_3$, . . . will generate a torque of driving forces which are adapted to promote rotation of the conversion member 3 about the axis of rotation R in a direction that corresponds to the direction from the actuator 2 that moves toward the conversion member 3 to the actuator 2' that moves away therefrom.

For example, the control of sequential actuation of the actuators 2, 2', 2" as shown in Figs. from 3 to 5 will cause the conversion member 3 to rotate about the axis of rotation R in an anticlockwise direction.

This is because the actuator 2" that is held still will oppose a substantially tangent friction resistance to the reaction of the stationary constraint means 4, for preventing the conversion member 3 from rotating in the opposite direction.

Specifically, assuming for simplicity that there is no friction between the actuators 2 and the annular member 3, the annular member 3 will slide on one of the pin members 7, while still adhering to the other two pin members 7', 7".

Therefore, the sliding force between the annular member 3 and the first pin member 7 will be opposed by the adhesion forces generated by the other two pin members 7', 7".

Therefore, the torque that the annular member 3 will be able to transmit will be given by the following formula:

$$C_m = \mu F'' * R + \mu F''' * R - \mu F * R$$

where $\mu$ is the friction coefficient, which is assumed for simplicity to be the same for all pin members 7, 7', 7", R is the mean radius of the annular member 3 and F, F', F" are the radially directed reactions exerted by each pin member 7, 7', 7".

If the approaching motion of the actuator 2 for imparting the deforming stress occurs at the same time as the departing motion of the actuator 2", then the stationary constraint means 4 will have a reaction that will promote rotation of the conversion member 3 about the axis of rotation R in the opposite direction.

Since the annular member 3 is interposed between the pin members 7 with substantially no radial clearance, the direction of rotation may be instantaneously reversed, by controlling the actuation sequence of the actuators 2.

Figure 6:
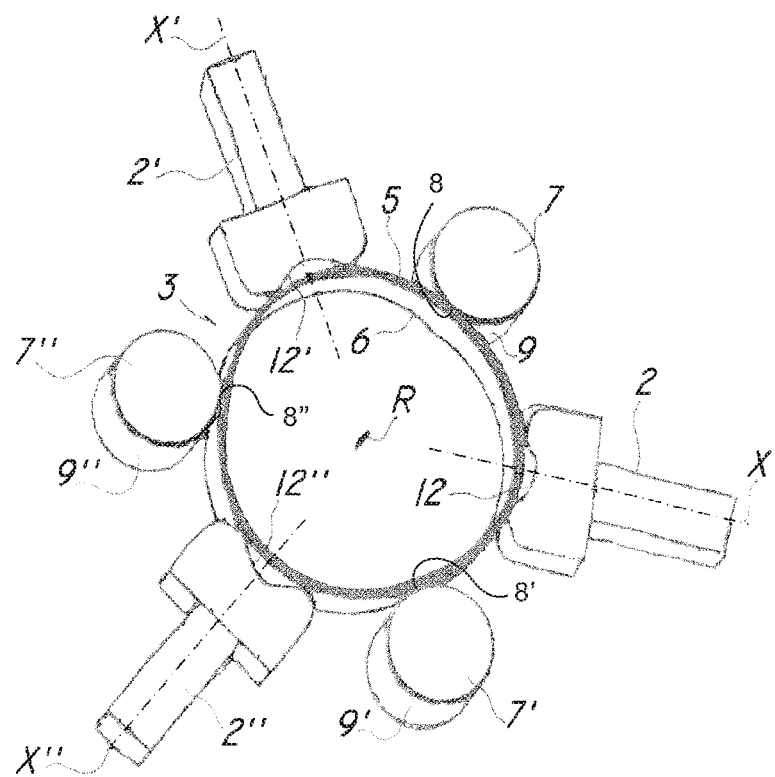
FIGS. 6 to 8 schematically show a few variants of the motor of FIG. 1.
Figure 7:
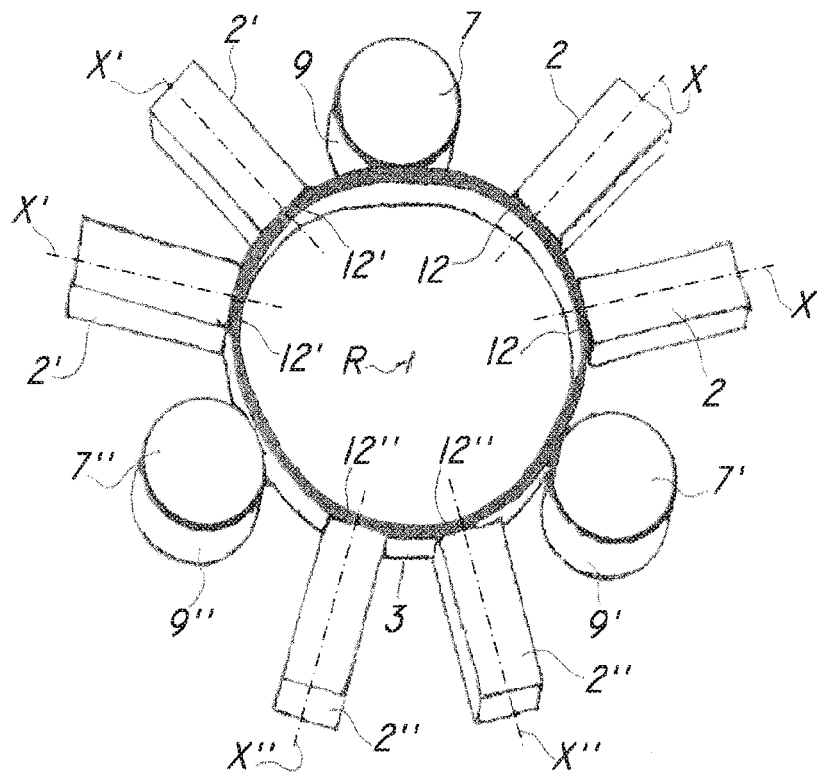
Figure 8:
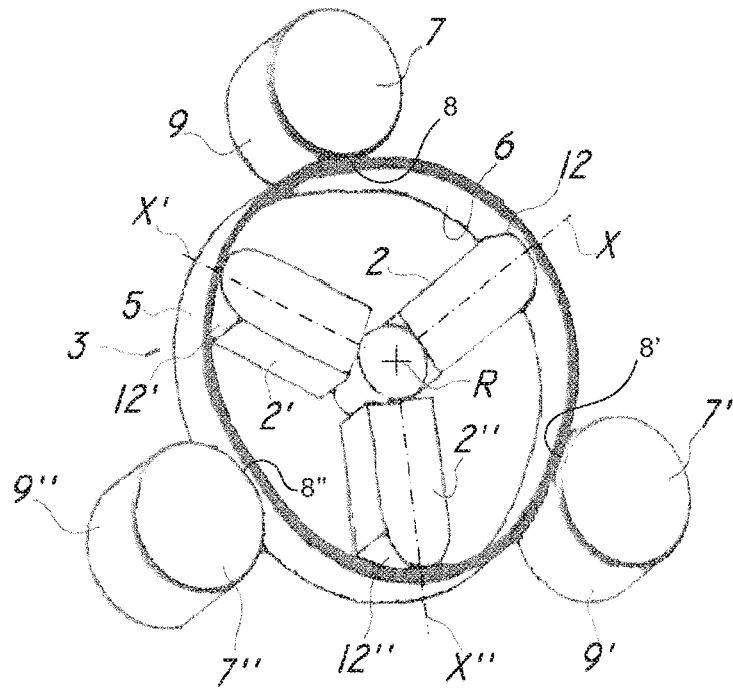

FIGS. 6 to 8 show three different variants of the above motor, whose operation will be substantially similar to that described above.

Particularly, the motor 1 of the variant of FIG. 6 differs from that of FIG. 1 in that each of the actuators 2 has a head with a front surface 12 formed with a concave central portion and convex side portions.

The variant of FIG. 7 differs from that of FIG. 1 in that two actuators 2 are disposed between each pair of successive pin members 7, whereby there will be a total number of six actuators.

Finally, the variant of FIG. 8 differs from that of FIG. 1 in that the actuators 2 are placed within the annular member 3 to interact with the inner surface 6 thereof, which will be also active, and in that the front surface 12 of the actuators 2 is convex.

Figure 9:
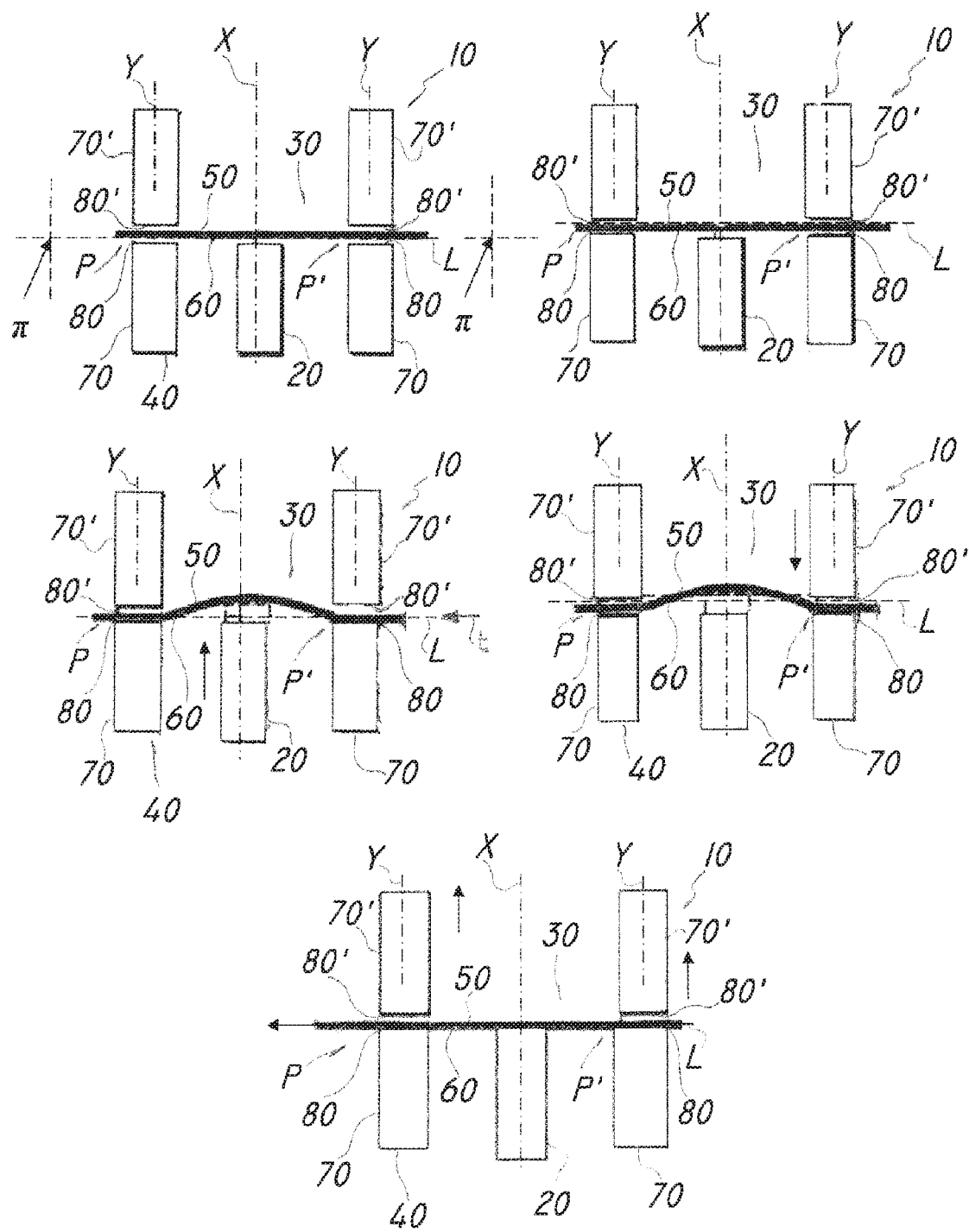
FIG. 9 schematically shows a motor of the invention in a second preferred configuration, and in a particular operational sequence.

FIG. 9 is a schematic view of a second configuration of a motor of the invention, generally designated by numeral 10, and a particular operational sequence thereof.

In this configuration, the motor 10 is a linear motor and has a substantially elongate conversion member 30, which is only partially shown, adapted to translate on the base plane $\pi$ along a substantially longitudinal middle line L parallel to the plane $\pi$.

The conversion member 30 is substantially straight with substantially flat and parallel opposite surfaces 50, 60, defining each an active surface.

Furthermore, the conversion member 30 may be operatively connected to a drive shaft or similar power take-off means, not shown, for the latter to ensure translation of a predetermined load parallel to the base plane $\pi$.

This configuration also comprises restraining means 40, which comprise one or more pairs of pin members 70, 70' in longitudinally offset arrangements.

Particularly, each pair comprises mutually facing pin members 70, 70' disposed on each side of the conversion member 30 and each having a front surface 80, 80' adapted to interact with respective active surfaces 50, 60.

Particularly, a first pin member 7 is stationary relative to the plane π whereas the second pin member 70' may be moved in its respective transverse direction Y in a sequential manner with respect to the movable pin members 70' of the other appropriately designed pairs.

The motor 10 also comprises a plurality of actuators 20, one of which is only shown in FIG. 9, operating in a substantially transverse direction X to interact with one of the active surfaces 50, 60 and transversely deform the conversion member 30 in the proximity of the constrained portion P.

The actuators 20 are longitudinally offset and disposed in alternation with the pairs of pin members 70, 70'. Furthermore, the actuators 20 may be either all disposed on one side of the conversion member 30 to interact with one active surface 50, 60, or on opposite sides.

The movable pin member 70' may be controlled such that the conversion member 30 is constrained from time to time at one portion P so that the deformation imparted by the actuator 20 causes a substantially longitudinal translational movement t of the portion P' that remains free.

Namely, upon translation of the actuator 20 for imparting the transverse deformation, the pin member 70' of the second pair will be actuated to constrain the portion P' that was previously left free and the movable pin member 70' of the first pair will be moved at the same time, in a substantially simultaneous or synchronized manner, for releasing the portion P that was previously constrained.

Thus, the synchronized movement of the corresponding movable pin members 70' and the actuators 20 will provide a resulting translation of the conversion member 30 in a predetermined direction.

The above disclosure clearly shows that the present invention fulfills the intended objects and particularly meets the requirement of providing a high-accuracy motor that can be easily manufactured and can provide high reliability. Furthermore, the motor of the invention may be easily scaled in size for application to a variety of fields.

The motor of this invention is susceptible to a number of changes and variants, within the inventive concept disclosed in the appended claims. All the details thereof may be replaced by other technically equivalent parts, and the materials may vary depending on different needs, without departure from the scope of the invention.

While the motor has been described with particular reference to the accompanying figures, the numerals referred to in the disclosure and claims are only used for the sake of a better intelligibility of the invention and shall not be intended to limit the claimed scope in any manner.

The invention claimed is:

1. A motor powered by linear actuators, comprising:
a base plane (π);
a plurality of linear actuators (2, 2', 2") having a reciprocating action in said plane (π) along respective action lines (X, X', X");
an elastic conversion member (3), designed to move in said plane (π) and to be connected to a drive shaft (S);
wherein said linear actuators (2, 2', 2") are operatively connected with said conversion member (3, 30) for converting the reciprocating motion of said linear actuators (2, 2', 2") into a substantially continuous motion of said conversion member (3, 30);
the motor further comprises stationary constraint means (4, 40) which are adapted to locally deform said conversion member (3, 30) and promote sliding and movement thereof in said plane (π) along a predetermined axis and in a predetermined direction in response to the action of said linear actuators (2, 2', 2", 20);
wherein said linear actuators (2, 2', 2") are placed within said elastic conversion member (3); and
wherein said conversion member (3, 30) is annular shaped and has opposite faces (5, 6; 50, 60), at least one of said faces (5, 6; 50, 60) being an active surface adapted to interact with said actuators (2, 2', 2", 20) and/or with said stationary constraint means (4, 40); said conversion member (3) is adapted to rotate about a central axis of rotation (R) substantially orthogonal to said base plane (π),
wherein said stationary constraint means (4) comprise a plurality of pin members (7, 7', 7") engaged with said plane (π) in fixed positions relative to said axis (R), said pin members (7, 7', 7") having lateral surfaces (9) adapted for interaction with said active surface (5) of said conversion member (3).

2. The motor as claimed in claim 1, wherein at least three of said pin members (7, 7', 7"), are located outside said conversion member (3) in angularly equally spaced positions, with their lateral surfaces (9) tangent to an inner circumference (C) having a diameter slightly smaller than the outer peripheral surface (5) of said conversion member (3), such that the latter may be radially deformed inwards, with three respective lobe-shaped portions (L1, L2, L3) being defined therein.

3. The motor as claimed in claim 2, wherein said linear actuators (2, 2', 2") have substantially radial action lines (X, X', X") relative to said axis (R) and are interposed between said pin members (7, 7', 7") to selectively and sequentially interact on said lobe-shaped portions (L1, L2, L3) to promote rotation of said conversion member (3) about said axis of rotation (R).

4. The motor as claimed in claim 1, wherein said linear actuators (2, 2', 2", 20) are selected from the group consisting of hydraulic, pneumatic, electric, piezoelectric and reciprocating actuators.

* * * * *